United States Patent [19]

Prescaro et al.

[11] Patent Number: 5,489,119
[45] Date of Patent: Feb. 6, 1996

[54] TETHERS WITH TEARSEAMS FOR AIR BAG CUSHION

[75] Inventors: Kay H. Prescaro, North Odgen; Thomas M. Kriska, Kaysville; Michael J. Ward, Liberty, all of Utah

[73] Assignee: Morton International, Inc., Chicago, Ill.

[21] Appl. No.: 427,632

[22] Filed: Apr. 21, 1995

Related U.S. Application Data

[63] Continuation of Ser. No. 159,069, Nov. 29, 1993, abandoned, which is a continuation of Ser. No. 940,255, Sep. 1, 1992, abandoned.

[51] Int. Cl.$^6$ ............................................ B60R 21/16
[52] U.S. Cl. ............................... 280/743.2; 280/730.1
[58] Field of Search .......................... 280/743.2, 743.1, 280/728.1, 730.1, 728.3

[56] References Cited

U.S. PATENT DOCUMENTS

| | | | |
|---|---|---|---|
| 3,831,972 | 8/1974 | Allgaier et al. | 280/730 R |
| 3,879,056 | 4/1975 | Kawashima et al. | 280/743 |
| 3,990,726 | 11/1976 | Oka et al. | 280/739 |
| 5,022,675 | 6/1991 | Zelenak, Jr. et al. | 280/743 R |
| 5,044,663 | 9/1991 | Seizert | 280/730 |
| 5,048,863 | 9/1991 | Henseler et al. | 280/743 R |
| 5,160,164 | 11/1992 | Fischer et al. | 280/743 A |
| 5,161,819 | 11/1992 | Rhodes, Jr. | 280/728 B |
| 5,249,825 | 10/1993 | Gordon et al. | 280/743 A |
| 5,333,903 | 8/1994 | Eyraimer et al. | 280/743 |

FOREIGN PATENT DOCUMENTS

| | | | |
|---|---|---|---|
| 3248944 | 11/1991 | Japan . | |
| 4176751 | 6/1992 | Japan . | |
| 4283145 | 10/1992 | Japan . | |
| 4310449 | 11/1992 | Japan . | |
| 4-310449 | 11/1992 | Japan | 280/743 A |

*Primary Examiner*—Eric D. Culbreth
*Attorney, Agent, or Firm*—Henry W. Tarring, II; Gerald K. White

[57] ABSTRACT

A guide device for directing the deployment of an automotive air bag cushion toward the torso of an occupant by means of a tether which is folded and attached to itself at a number of locations by rupturable seams. As the air bag cushion deploys the truncated tether or tethers cause the cushion to rotate about a point where the cushion is attached to the canister thereby moving the cushion in a downward direction. The cushion is thereby moved into position in front of the occupant's torso more quickly than an air bag cushion equipped with a tether without tearseams.

14 Claims, 4 Drawing Sheets

5,489,119

TETHERS WITH TEARSEAMS FOR AIR BAG CUSHION

This is a continuation of application Ser. No. 08/159,069 filed on Nov. 29, 1993 and abandoned, which is a continuation of application Ser. No. 07/940,255 filed on Sep. 1, 1992, abandoned.

BACKGROUND OF THE INVENTION

1. Field of the Invention

This invention relates generally to inflatable type modular occupant restraint systems for passenger vehicles or, as it is more commonly known, an air bag restraint system. Such a system may be installed in an automobile or other vehicle, at least in part on the steering wheel for the protection of the driver and also in the dashboard or passenger side instrument panel for passenger protection in the event of a collision. More particularly, this invention relates to an improvement in a means for controlling the initial deployment of the air bag cushion.

2. Description of Related Art

An air bag restraint system module typically includes a canister, which has an open side and encloses an inflator and at least part of an air bag, and a cover which conceals the module from view. When an air bag module is designed for the driver side of a vehicle the module is located in the steering wheel behind a cosmetic cover which is an integral part of the steering wheel design. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard.

When the vehicle is involved in a collision, a crash signal initiates operation of the inflator to cause the air bag cushion to deploy. The inflator produces an inert gas (e.g., nitrogen) which is directed under pressure into the air bag cushion to force the air bag cushion out of the container and through the opening provided by rupturable tearseams in the steering wheel cover, or tearseams or a hinged cover in the dashboard, and into the passenger compartment of the vehicle. As the air bag cushion is directed into the passenger compartment, it is inflated by the continued flow of gas produced by the inflator. An untethered driver side air bag cushion deploys to fill the space between the steering wheel and the driver's head and upper torso. On the passenger side the air bag cushion is directed between the windshield and the occupant to fill the space between the windshield and the occupant's head and upper body. During the early stages of the air bag cushion's deployment, it is preferable to expand the air bag cushion between the steering wheel or dashboard of the vehicle and the occupant's torso in order that the momentum of the moving occupant can be initially absorbed from the occupant's torso. After the initial contact the air bag cushion still provides protection to the head and upper body of the occupant during a collision.

Tethers have been used to guide the deployment of an air bag cushion for motor vehicle occupant protection. Air bag cushions are commercially available with tethered driver side and passenger side air bag cushions wherein the tethers are attached by fastener members to the impact absorbing part of the air bag cushion and to the air bag cushion near the gas inlet opening. During high energy collisions a tethered air bag cushion is positioned to receive the initial impact from the vehicle occupant's head and upper torso.

SUMMARY OF THE INVENTION

An object of this invention is to provide a means for quickly moving the air bag cushion into place between the occupant's torso and the steering wheel during deployment of the air bag cushion.

Another object of this invention is to provide a means for quickly moving the air bag cushion into position between the occupant's torso and the instrument panel during deployment of the air bag cushion.

Another object of this invention is to provide a means for deploying the air bag cushion such that the initial contact is made between the air bag cushion and the occupant's torso.

Another object of this invention is to provide a means for reducing the momentum of the deploying air bag cushion.

Another object of this invention is to provide a means for lowering the deployment angle of the air bag cushion.

Another object of this invention is to provide a means for moving the air bag into the proper position to absorb the momentum of the occupant's torso.

These and other objectives of the invention, which will become apparent from the following description, have been achieved by a novel tether system for use with automotive air bag cushions. The tethers of this invention are folded and attached upon themselves at one or more locations by a rupturable fastener means which will release when a sufficient amount of tension is applied to the tether.

The air bag cushion used with the tether system of this invention comprises a first portion, having a front surface and a back surface. This first portion is disposed opposite the occupant of a vehicle when the cushion is deployed. A second portion of the air bag cushion is attached to the first portion and terminates in a third portion defining a gas inlet opening for the air bag cushion. At least one tether having a first end and a second end, and a first edge and a second edge, with the first end of each tether attached to the back surface of the first portion of the air bag cushion and the second end of each tether is attached adjacent the third portion of the air bag cushion. Each of the tethers are folded upon themselves to form at least a first tether section and a second tether section. Each of the first tether sections are joined to the respective second tether sections at least at one spaced contact point by rupturable attachment means.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DETAILED DESCRIPTION OF THE INVENTION

Figure 1:
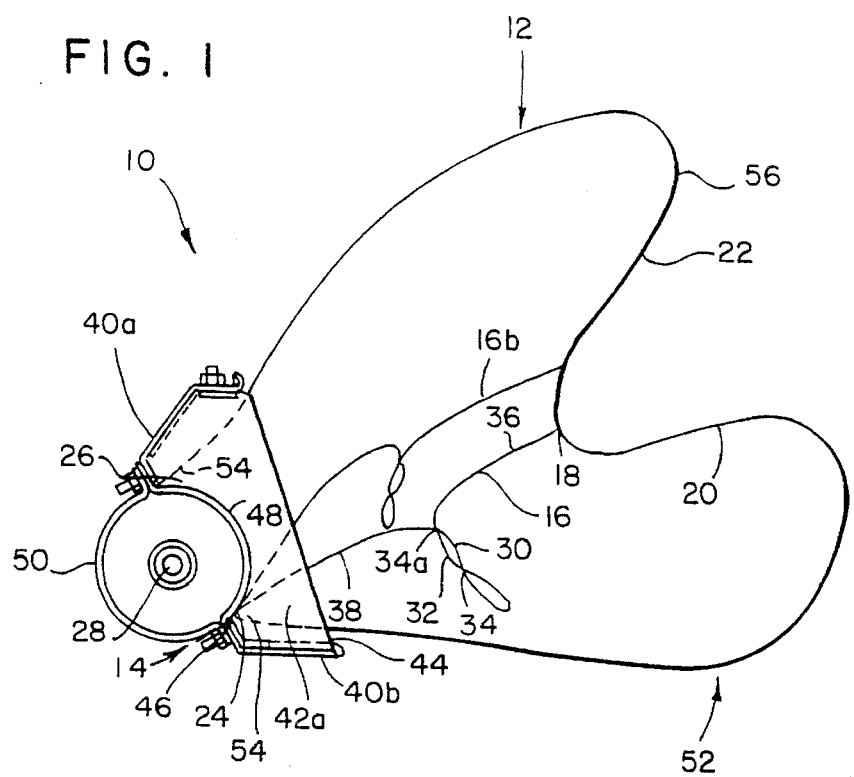
FIG. 1 is a side plan view of a passenger side air bag cushion containing tethers with tearseams illustrating the air bag cushion in a partially deployed condition before the rupturable attachment means have released.
Figure 2:
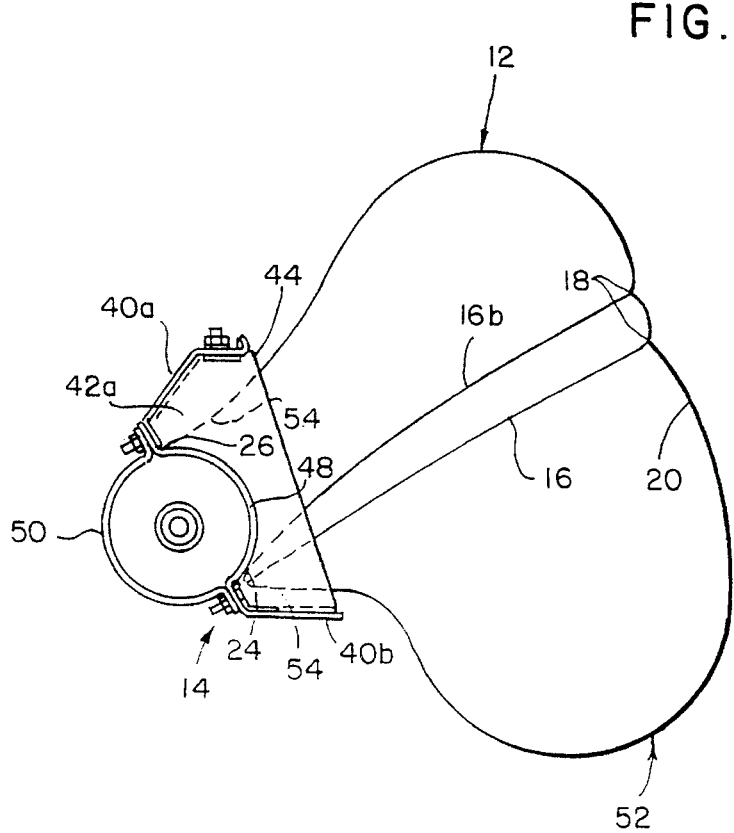
FIG. 2 is a side plan view of the air bag cushion and tether illustrating the air bag cushion in a fully deployed condition after the rupturable attachment means of the tether have released.

As best seen in FIG. 1, an air bag deployment control device shown generally at 10 is provided for directing the deployment of an air bag cushion 12 from a module canister 14 toward a vehicle occupant. A tether 16 having a first end 18 attached to the back surface 20 of the air bag cushion first portion 22, and a second end 24 attached adjacent a gas inlet opening 26 provided for receiving a gas from an inflator 28. The tether 16 is folded upon itself to form at least a first section 30 and a second section 32. The tether first section 30 is attached to the tether second section 32 at least at one location by rupturable fastener means 34. Additionally, the folded tether 16 may include a tether third section 36 formed between the tether first end 18 and the first rupturable fastener means 34a, and a tether fourth section 38 between the first rupturable fastener means 34a and the tether second end 24. Upon deployment of the air bag cushion 12 from the canister 14 the expansion of the cushion 12 is halted momentarily by the shortened tether 16 causing, it is believed, the air bag cushion to pivot around the tether second end 24. As tension is applied to the tether 16 by the expanding cushion one of the rupturable fastener means 34 releases thereby allowing the cushion first portion 22 to proceed out of the canister 14 until the tether 16 again reaches the maximum length permitted by the rupturable fastener means 34.

Figure 5:
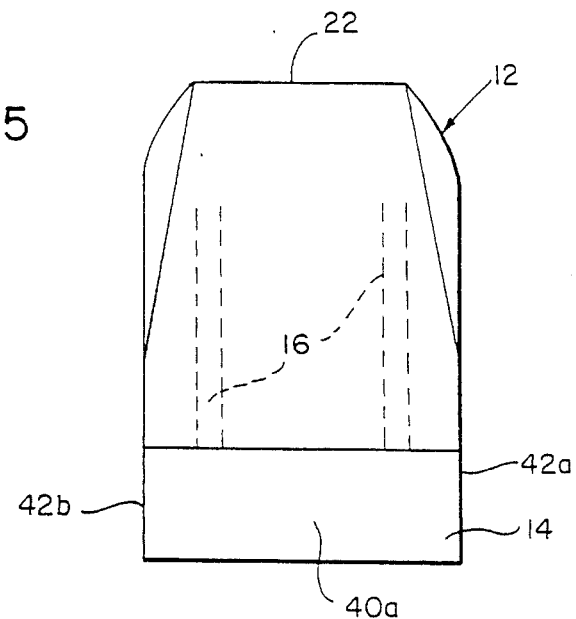
FIG. 5 is a top plan view of the air bag cushion illustrating one possible tether arrangement.

The canister 14 for use with the tether of this invention includes any canister known in the art for use with a passenger side air bag restraint system or an air bag module known in the art for use with a driver side air bag restraint system. The tether of this invention was used with a passenger side canister 14 which includes a pair of first walls 40a and 40b (top and bottom respectively when viewed from above) and a pair of second walls 42a and 42b (left and right respectively when viewed from above) that define respectively a top opening 44 and a bottom opening 46 as shown in FIGS. 1 and 5. An air bag inflator 28 is held between a diffuser 48 and a cap 50 attached to the bottom opening 46 of the canister 14. Adjacent the inflator 28 and attached thereto is an air bag cushion 12 having a first portion 22 disposed in front of the occupant of the vehicle when the air bag cushion 12 is deployed. An air bag cushion second portion 52 is attached to the first portion 22 and terminates in a third portion 54 defining a gas inlet opening 26 for the air bag cushion. The air bag cushion first portion 22 has a front surface 56 which faces the occupant during deployment of the air bag cushion 12 and a back surface 20 which faces the interior of the air bag cushion 12. The air bag cushion 12 used with this invention can be any air bag cushion known in the art.

Figure 3:
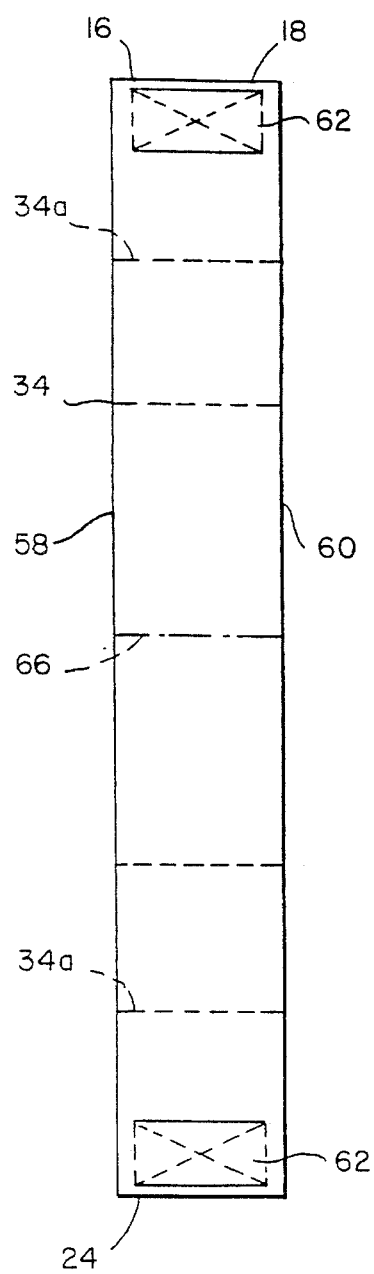
FIG. 3 is a top plan view of the tether of this invention illustrating the stitching arrangement for rupturable fastener means.
Figure 7:
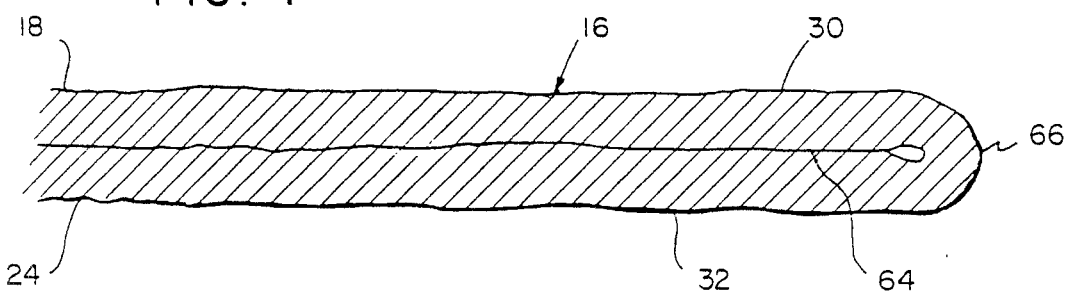
FIG. 7 is a side plan view of a tether illustrating an alternate way of attaching the rupturable attachment means.
Figure 8:
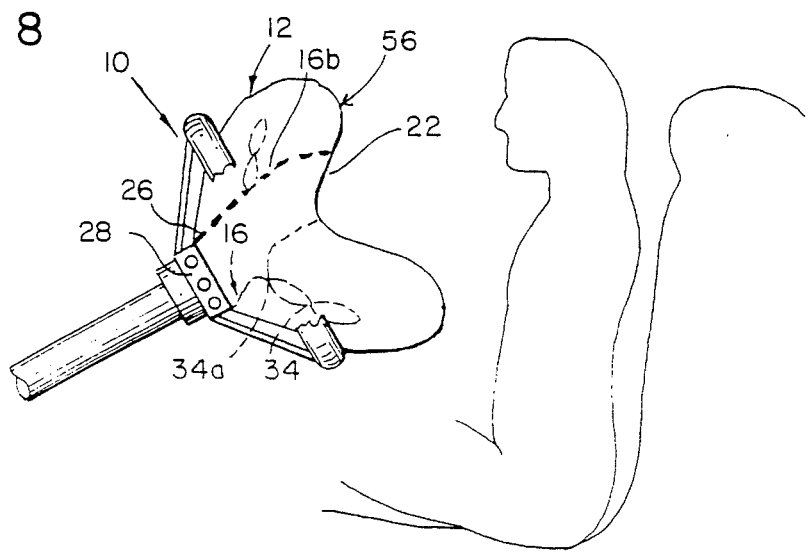
FIG. 8 is a side plan view of a driver side air bag cushion containing tethers with tearseams illustrating the air bag cushion in a partially deployed condition before the rupturable attachment means have released.

The tether 16 of this invention includes a first end 18, a second end 24, a first edge 58, and a second edge 60, as shown in FIG. 3. The tether 16 first end 18 is attached to the back surface 20 of the air bag cushion 12 by any suitable means such as stitching or the like. Preferably a box stitch 62, as shown in FIG. 3, is used. The tether second end 24 is attached to the air bag cushion 12 adjacent the air bag cushion third portion 54, preferably with a box stitch 62. Also, the tether second end 24 can be attached securely to the canister 14 adjacent the location where the air bag cushion third portion 54 is attached to the canister 14. Preferably the tether second end 24 is attached to the bottom canister first wall 40b by appropriate fastening means such as rivets, bolts, or the like. The tether 16 is folded upon itself to form at least a first section 30 and a second section 32. The first section 30 is attached to the second section 32 by rupturable fastener means 34. The rupturable fastener means 34 of this invention is any suitable attachment means which will release when tension is applied to the tether 16 at the first end 18 and the second end 24. The rupturable fastener means 34 must be such that it will release without resulting in the tearing of the tether. Further, the rupturable fastener means 34 must be such that it will fail under cold operating conditions (approximately −30° C.), while still being able to provide momentary resistance to applied force under hot operating conditions. The preferred rupturable fastener means for use with this invention is a rupturable stitch, preferably a lock stitch. The stitch may span the entire distance from the tether first edge 58 to the tether second edge 60 or any portion of the distance in between the first edge 58 and the second edge 60. In place of a rupturable stitch a hook and loop type fastener such as a Velcro® fastener may be used. The rupturable fastener means 34 are placed at a number of spaced locations along the length of the tether 16. Alternatively a rupturable stitch or a hook and loop type fastener such as a Velcro® 64 may be run the length of the tether 16 as shown in FIG. 7.

The tether 16 can be made from any suitable flexible material having sufficient strength so as not to fail under the forces of the deploying air bag cushion. Material used in the manufacture of the air bag cushion can be used in the manufacture of the tether. Materials suitable for use in this invention are woven or knit fabrics made from nylon, polyester, polyamide fibers, or other suitable materials. Natural fibers or fibers subject to structural degradation by molds or bacteria should not be used. Further, materials not approved for use in automotive vehicle interiors should not be used. Thread used in the stitching of the rupturable stitch can be made from any suitable fiber made from nylon, polyester, polyamide fibers, or the like. As with the material used for manufacture of the tether 16, natural fibers or fibers subject to structural degradation by molds or bacteria should not be used for the rupturable fastener means 34.

Reinforcement of the tether 16 where the rupturable fastener means 34 are located may be necessary to provide appropriate structural integrity to the tether material. These reinforcements can be made from any material suitable for providing structural integrity to the tether 16.

Figure 4:
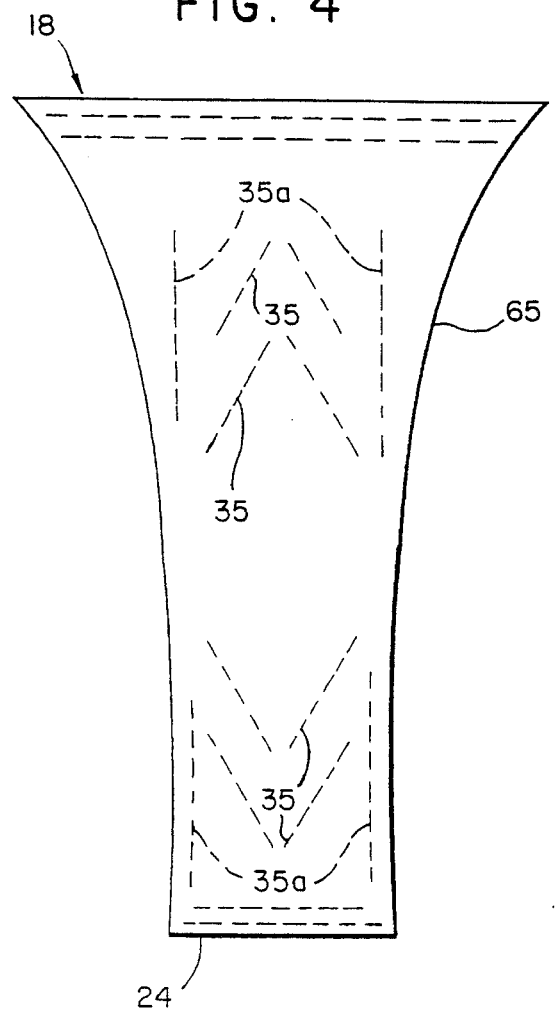
FIG. 4 is a top plan view of an alternate tether for use with this invention illustrating the stitching arrangement for the rupturable fastener means.

A single tether 16 or a single pair of narrow tethers 16 of the type shown in FIG. 3 can be used. Multiple pairs of tethers 16 can be used, however, one pair of tethers 16 is preferred as shown in FIG. 5. The number of tethers 16 used is determined by the particular application. Tether panels 65 as shown in FIG. 4 may also be used. Again, as with the narrow tethers 16 single or multiple tether panels 65 may be used. When two pairs of narrow tethers 16 or tether panels 65 are used the tethers 16 are oriented as shown in FIG. 1 with the first set of tethers 16 and the second set of tethers 16b. Each of the tethers 16 are folded about a fold line 66 and multiple rupturable fastener means 34 are used to attach the two sections as shown in FIGS. 3 and 4. When a tether panel, as shown in FIG. 4 is used either a rupturable fastener means 34 sewn as a rupturable "V" stitch 35 or straight stitch 35a can be used. When a lock stitch is used as the rupturable fastener means 34 with a single pair of narrow tethers 16 it is preferable to use two rows of lock stitches for the first stitches 34a and a single row of lock stitches for subsequent rupturable stitches. The number and type of stitches actually used is determined by the particular application.

To assemble an air bag cushion with the tethers of this invention the tethers can have the rupturable fastener means attached and the tether can then be installed in the air bag cushion in a manner similar to the installation of a conventional tether. Also, the tether can be installed in the air bag cushion without the rupturable fastener means and then the rupturable fastener means can be affixed to the tether. It is preferable to affix the rupturable fastener means prior to installation of the tether in the air bag cushion. The air bag cushion with the tether of this invention is then installed in a canister or attached to a module housing by means known in the art. When the tether second end is attached to the canister the tether with the rupturable fastener means is attached to the air bag cushion and the tether second end is attached to the canister and the air bag cushion is installed by means known in the art. The air bag restraint system with the tether of this invention can then be installed behind the dashboard of the passenger compartment of the a vehicle or in the steering wheel of a passenger vehicle.

Figure 6A:
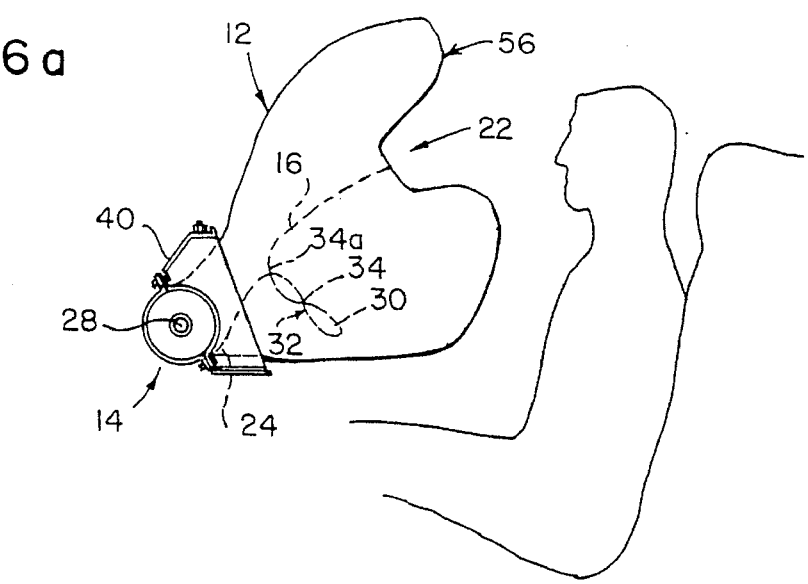
FIGS. 6a, 6b, and 6c are a sequence of side plan views of the air bag cushion illustrating the operation of the tethers of this invention during deployment of the air bag cushion.
Figure 6B:
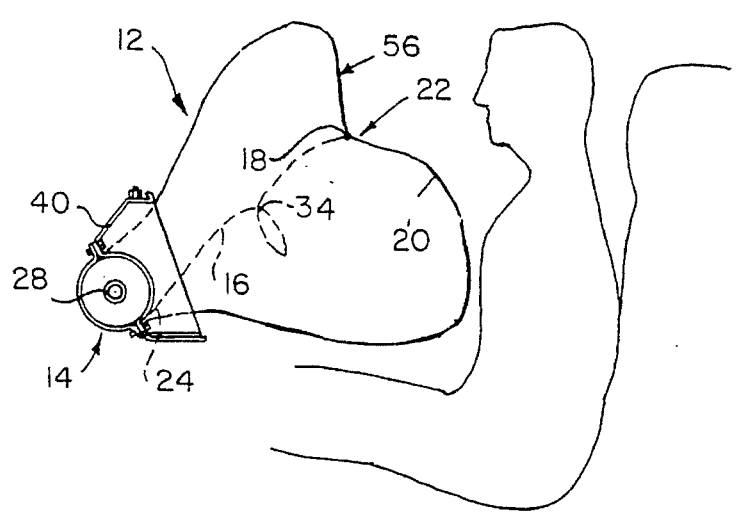
Figure 6C:
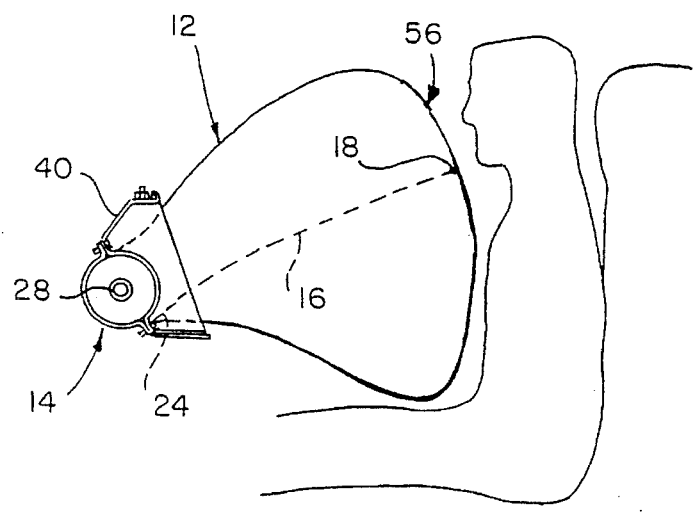

A signal from a crash sensor (not shown) triggers the generation of gas by the inflator. The gas flows into the air bag cushion from the inflator through the air bag cushion gas inlet. The expanding air bag cushion ruptures the tearseam of the module cover or opens the hinged cover and starts to deploy into the vehicle passenger compartment. The air bag cushion deploys to the maximum amount permitted by the tether truncated due to the rupturable fastener means as shown in FIG. 6a. It is believed that the truncated tether causes the air bag cushion to pivot around the tether second end 24. As tension is applied to the tether by the deploying air bag cushion the first rupturable fastener means releases permitting the deploying air bag cushion to expand to a point shown in FIG. 6b. Again, it is believed that the truncated tether causes the air bag cushion to pivot further about the tether second end 24. This process continues until all of the rupturable fastener means have released and the air bag cushion is fully deployed as shown in FIG. 6c.

Thus, in accordance with the invention, there has been provided a means for quickly moving the air bag cushion into place between the occupant's torso and the instrument panel during deployment. There is also provided a means for deploying the air bag cushion such that the initial contact between the air bag cushion and the occupant is at the occupant's torso. There has also been provided a means for moving the air bag cushion into the proper position to better absorb the momentum of the occupant's torso. There has also been provided a means for reducing the momentum of the deploying air bag cushion. Additionally, there has been provided a means for lowering the deployment angle of the air bag cushion.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appended claims.

We claim:

1. In an automotive air bag assembly comprising a gas generator actuable to generate a gas under pressure, actuation means to actuate said gas generator, an air bag cushion having a first portion with a front surface and a back surface, a second portion attached to said first portion and terminating in a third portion, said third portion defining a gas inlet opening in said air bag cushion for receiving said gas from said gas generator, and at least one tether attached to said air bag cushion to restrain and direct its deployment; the improvement comprising said at least one tether having a first end attached to the back surface of said first portion of said airbag cushion and a second end attached adjacent said third portion of said air bag cushion, each of said at least one tethers being folded upon itself to form a first tether section and a second tether section, each of said first tether sections being joined to the corresponding said second tether section at at least one contact point by releasable attachment means to thereby form a truncated tether having a releasable shortened length, a first end of said tether being attached to the back surface of said first portion of said air bag cushion and a second end of said tether being attached adjacent said third portion of said air bag cushion such that, upon actuation of said gas generator, said air bag cushion is free to deploy until said tether is extended to said releasable shortened length, said tether then restraining expansion of said air bag cushion and causing said air bag to pivot about said second end of said tether until said releasable attachment means release allowing said air bag cushion to further expand.

2. The air bag assembly of claim 1, wherein said second end of said tether is attached adjacent a side of the gas inlet opening of the air bag cushion, which side, when mounted in an automobile, will be closer to the location of the lower torso of the passenger to be protected than is the center of the gas inlet opening, whereby, during deployment, said air bag cushion will pivot toward said lower torso location when restrained by the tether at said releasable shortened length.

3. The air bag assembly of claim 1, wherein said first tether section and said second tether section are joined at at least two spaced contact points by releasable attachment means provided at each of the spaced contact points, whereby the further expansion of said air bag cushion occurring after the release of the initial releasable attachment means, is further restrained when said tether extends to place the second releasable attachment means under tension, which further restraint is removed permitting said air bag cushion to further expand upon the release of said second releasable attachment means.

4. The air bag assembly of claim 1, wherein after final deployment, the fully extended length of said tether provides for it to function to restrain further deployment of the air bag cushion.

5. The air bag assembly of claim 1, further comprising a canister, said canister having walls defining a cavity in which is located said gas generator and at least part of the folded inflatable air bag cushion, said walls further defining an opening to said cavity, said opening being in communication with said gas inlet opening in said air bag cushion, and wherein said second end of said tether is securely attached to the wall of said canister adjacent to said third portion of said air bag cushion.

6. The air bag assembly of claim 5, wherein said canister is configured to be mounted behind the dashboard of the automobile whereby, upon activation, said air bag cushion deploys in the direction of the location that a passenger in said automobile would normally occupy.

7. The air bag assembly of claim 1 wherein said releasable fastener means comprises a rupturable stitch.

8. The air bag assembly of claim 7 wherein said rupturable stitch extends transversely across said tether.

9. The air bag assembly of claim 7 wherein said rupturable stitch extends longitudinally along at least a portion of the length of said tether.

10. The air bag assembly of claim 1 wherein said releasable fastener means comprises a hook and loop fastener.

11. The air bag assembly of claim 1 wherein said tether is a fabric made from a material selected from the group consisting of nylons, polyesters, polyamides and mixtures thereof.

12. In an automotive airbag assembly comprising a gas generator actuable to generate a gas under pressure, actuation means to actuate said gas generator, an air bag cushion having a first portion with a front surface and a back surface, a second portion attached to said first portion and terminating in a third portion, said third portion defining a gas inlet opening in said air bag cushion for receiving said gas from said gas generator, and at least one tether attached to said air bag cushion to restrain and direct its deployment; the improvement comprising said at least one tether having a first end attached to the back surface of said first portion of said air bag cushion and a second end attached adjacent said third portion of said air bag cushion, said at least one tether being folded upon itself to form a first tether section and a second tether section, each of said first tether sections being joined to the corresponding second tether section at at least one contact point by releasable attachment means to thereby form a truncated tether having a releasable shortened length, a first end of said tether being attached to the back surface of said first portion of said air bag cushion and a second end of said tether being attached to said third portion of said air bag cushion such that, upon actuation of said gas generator, said air bag cushion is free to deploy until said tether is extended to said releasable shortened length, said tether then restraining expansion of said air bag cushion and causing said air bag to pivot about said second end of said tether until said releasable attachment means release allowing said air bag cushion to further expand.

13. A vehicle air bag assembly comprising a gas generator which is actuable to produce sufficient gas to inflate an associated air bag cushion, an air bag cushion having an opening in communication with said gas generator, an actuation device operable to actuate said gas generator, at least one tether having (a) a first end attached to the inside of that portion of the air bag cushion which, when deployed, is designed to be directly in front of a vehicle occupant and (b) a second end attached adjacent the lower portion of said opening, said tether being folded and attached to itself by at least one releasable attachment means, said first and second ends of said tether also being attached at locations relative to each other such that upon actuation of said gas generator, produced gas inflates said air bag cushion causing said tether to extend to a length at which said releasable attachment means is placed under tension, and the first end of the tether with its attached air bag cushion is caused to pivot downward about the tether's attached second end causing the direction of deployment of said airbag cushion to be lowered.

14. The air bag assembly of claim 13, wherein said first end of said at least one tether is attached at a position in the upper half of that portion of the air bag cushion which, when deployed, is designed to be directly in front of a vehicle occupant.

* * * * *

UNITED STATES PATENT AND TRADEMARK OFFICE
CERTIFICATE OF CORRECTION

| | | |
|---|---|---|
| PATENT NO. : | 5,489,119 | |
| DATED : | February 6, 1996 | |
| INVENTOR(S) : | Kay H. Prescaro, Thomas M. Kriska and Michael J. Ward | |

It is certified that error appears in the above-indentified patent and that said Letters Patent is hereby corrected as shown below:

Col. 3, lines 9-13, should be deleted.

Col. 3, line 40, the sentence -- The deployment process continues until all the rupturable fastener means 34 are released thus permitting the tether16 to extend to its full length." --should be inserted after"...fastener means 34."

Claim 1, col. 6, line 14, "each of" should be deleted.

Signed and Sealed this

Twenty-sixth Day of November 1996

Attest:

BRUCE LEHMAN

Attesting Officer     Commissioner of Patents and Trademarks